March 3, 1970  H. J. MacMILLAN  3,498,120
FABRIC STRENGTH MEASURING DEVICE
Filed April 16, 1968  2 Sheets-Sheet 1
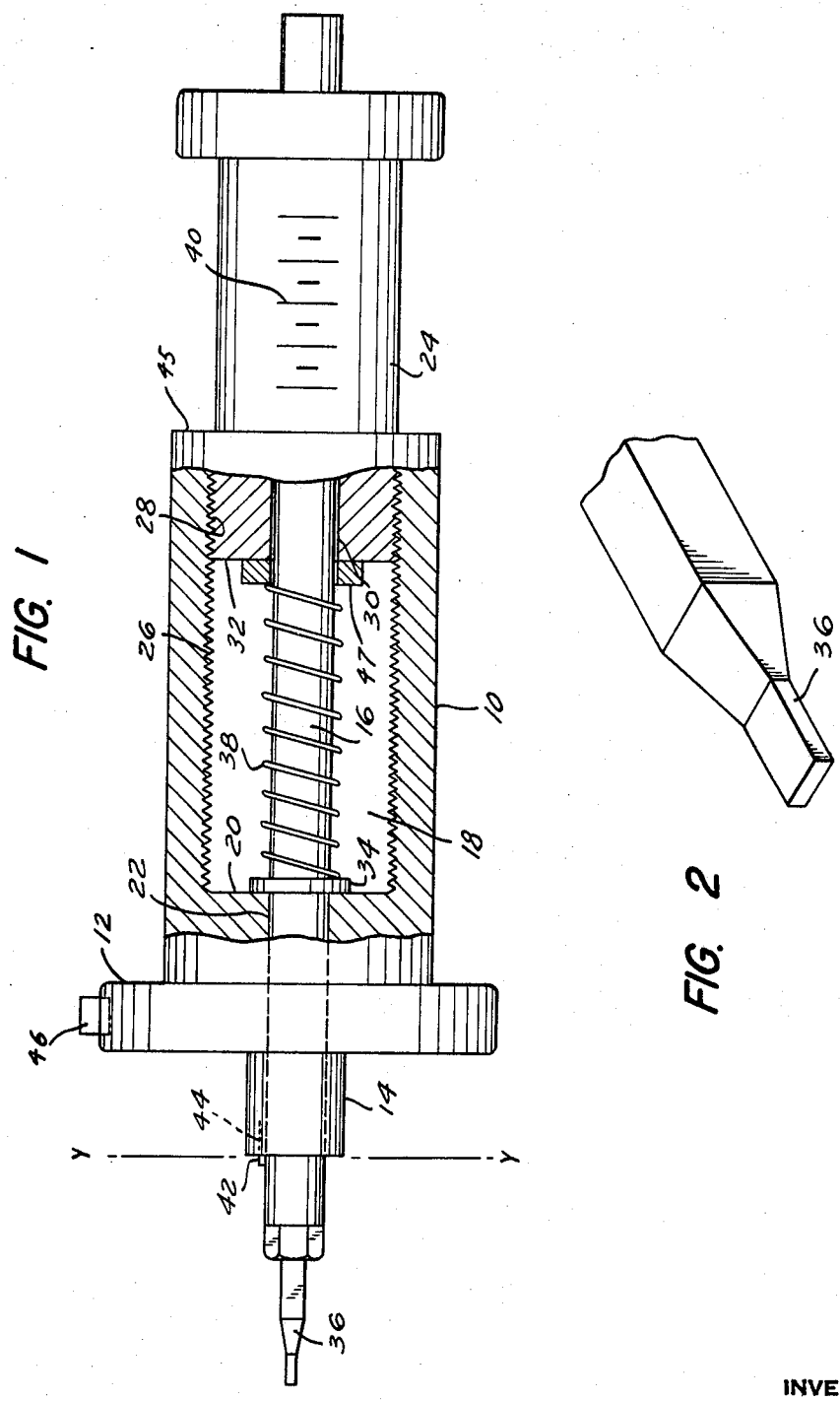
INVENTOR
HENRY J. MacMILLAN
BY
Kane, Dalsimer, Kane, Sullivan + Smith
ATTORNEYS March 3, 1970 H. J. MacMILLAN 3,498,120
FABRIC STRENGTH MEASURING DEVICE
Filed April 16, 1968 2 Sheets-Sheet 2

INVENTOR
HENRY J. MACMILLAN
BY
ATTORNEYS

United States Patent Office 3,498,120
Patented Mar. 3, 1970

3,498,120
FABRIC STRENGTH MEASURING DEVICE
Henry J. MacMillan, Delmar, N.Y., assignor to Albany Felt Company, Albany, N.Y., a corporation of New York
Filed Apr. 16, 1968, Ser. No. 721,724
Int. Cl. G01n 3/42
U.S. Cl. 73—102           5 Claims

ABSTRACT OF THE DISCLOSURE

A device for testing a papermakers felt while in position upon a machine in order to determine whether the felt has retained sufficient strength to safely continue in operation and also to measure the remaining strength of the felt. A non-cutting blade is pressed against the felt in order to test its strength.

BACKGROUND OF THE INVENTION

Papermaker's felts such as dryer fabrics deteriorate with use due to various types of mechanical wear and the effects of moisture and elevated temperatures during use.

It is desirable to obtain as long life as possible from a dryer fabric. If a dryer fabric is allowed to run up to the point where it fails and can no longer be used, there is the possibility of tearing which can result in machine damage in addition to the unscheduled and unplanned interruption of production.

There is a requirement in the industry for a means of determining the remaining strength in a dryer fabric while it is on the machine in order to judge whether it has reached the end of its useful life and should be replaced. There is no requirement that the measurement be made while the fabric is running. Tests can be made at scheduled shut-downs, with the machine stopped. It is not sufficient that techniques allow tests to be made only at or near the edges of the fabric because there may be weak areas in the center portion which would therefore remain undetected. Any test method should be applicable to and allow for testing at any place across the entire width of the fabric and with access to only one face of the fabric.

It is necessary to be able to determine the fabric strength in either the lengthwise or the crosswise direction and to distinguish between the two.

A testing device and technique should be able to determine whether the fabric has enough strength to continue to run safely and also to be able to measure the remaining strength of the fabric; and it is desirable to obtain the answer to the first question without damaging the fabric, that is, without making a hole in it.

SUMMARY OF THE INVENTION

A fabric testing device including a handle, a plunger slidably supported in said handle for longitudinal movement relative to said handle, spring means yieldingly urging said plunger to a normal position longitudinally of said handle, a plunger portion projecting from the handle in said normal position and a non-cutting blade supported by said plunger portion to be impressed upon a yarn or yarns of said fabric whereby upon pressing said blade against said yarn said plunger will be moved against the force of said spring and relative to said handle when the strength of said yarn is sufficiently high to resist breaking.

DESCRIPTION OF THE DRAWINGS

In the accompanying drawings:
FIG. 1 is a longitudinal view of a fabric testing device constructed in accordance with the teachings of this invention with the plunger in the normal position thereof and portions of the device broken away;

FIG. 2 is an enlarged isometric view of the blade of the device shown in FIG. 1;

DESCRIPTION OF THE PREFERRED EMBODIMENT

Figure 3:
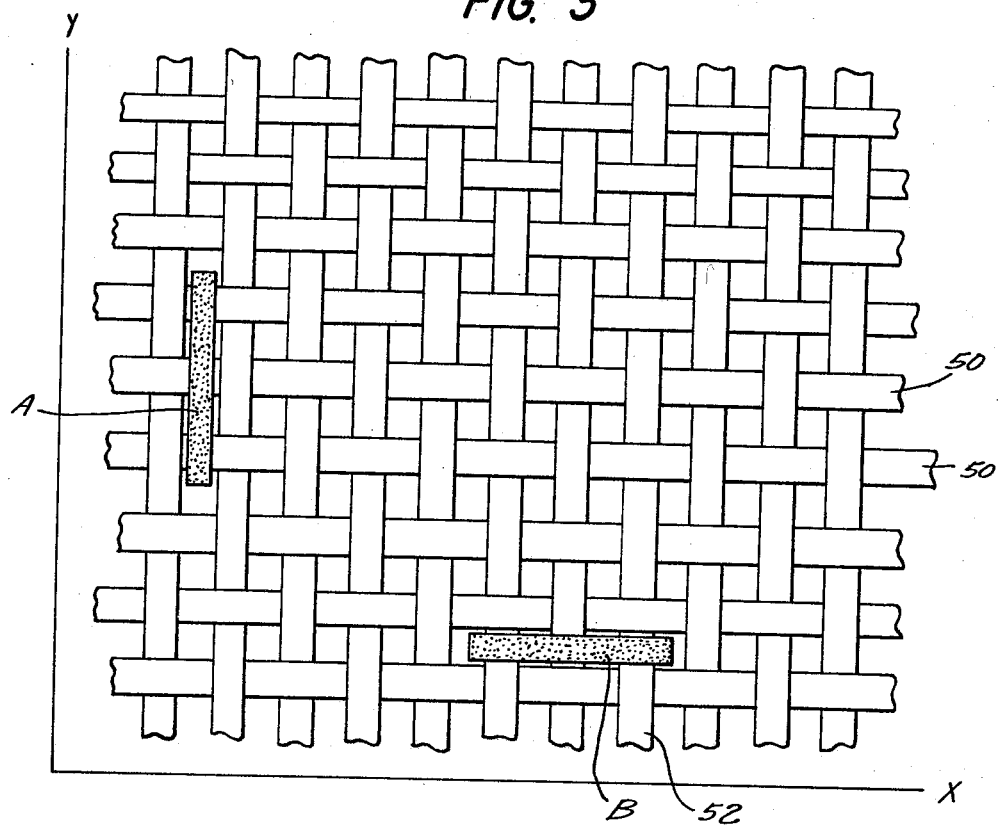
FIG. 3 is an enlarged segmentary view of a fabric to be tested with the testing device of FIG. 1 with the blade of the testing device diagrammatically shown imposed thereon.

It has been found that the force required to cause penetration through the fabric by a narrow chisel-shaped blade, with a blunt (not sharp) end, provides a measure of the strength of the fabric. The embodiment of this is a device capable of applying a measured force selectively to yarns of a fabric by means of a calibrated spring displaced a known distance. This makes it possible either to apply a known force which may or may not be sufficient to puncture the fabric by breaking the yarn, or to measure the magnitude of the force required to puncture the fabric by breaking the yarn.

In FIG. 1 a cylindrical handle 10 is shown with grip 12 and bored handle end portion 14 slidably supporting plunger 16. The handle has an enlarged central bore 18 which is closed at one end by wall 20 of handle 10 through which the bore of end portion 14 is continued and shown in FIG. 1, as indicated by the numeral 22, and the central bore 18 is closed at its remaining end by spring cover 24. Central bore 18 is bounded by internal threads 26 of handle 10 allowing for engagement with the external threads 28 of one end of the spring cover 24. The spring cover is provided with a bore 30 of like diameter as bore 22, which diameter is slightly greater than the outside diameter of plunger 16 within the handle so that the remaining end of plunger 16 can be supported by spring cover 24 in bore 30. Plunger 16 is slidably movable longitudinally within bore 30 and spring cover 24 and handle 10 are not longitudinally movable relative to one another unless the spring cover and handle are rotated to bring end wall 32 of the spring cover closer to or further away from wall 20 of handle 10 by means of the threads 28 and 26, respectively, on the spring cover and handle. The plunger is provided with a flange 34 which cooperates with wall 20 of the handle to form an end stop determining the extreme position of the plunger within the handle 10 in the normal position of the device. Blade 36, which is supported by the plunger, is chisel-shaped with its free blunt end defining a non-cutting rectangular plane.

A helical coil 38 is wrapped around plunger 16 with one end of the coil adjacent flange 34 and the remaining end of the coil adjacent to thrust washer 47 which bears against end wall 32. The coil yieldingly urges the plunger to the left, as seen in FIG. 1. The spring force exerted depends upon the deformation of the spring or coil 38. The cover 24 can be provided with indicia which can be calibrated as a measure of the spring force, using the end wall 45 of handle 10 as an index point.

The plunger can be keyed at 42 and a keyway 44 provided in the end 14 of the handle so that the plunger will not rotate as it is pressed to the right as shown in FIG. 1. Additionally, grip 12 is provided with a projection 46 so that a user will be able to determine by feel the orientation of the blade.

With such a device the positioning of the blade, as seen in FIG. 3, is such that in the position indicated by the letter A the blade will allow for testing of the lengthwise yarns 50. If the blade is oriented as indicated by the letter B in FIG. 3, it will allow for testing the crosswise yarns 52.

In use, the blade is placed against the fabric to be tested near a supporting roll, and the handle containing the spring is pushed toward the fabric. The plunger on which the blade is mounted is forced into the handle until the end of the blade is even with the end of the handle, as indicated by the line Y—Y in FIG. 1. This gives a uniform displacement of the spring for each determination. The force required for that amount of displacement can be varied by screwing the spring cover in to increase the force, or out to decrease it. The amount of force for that displacement can be read from the scale 40.

Figure 4:
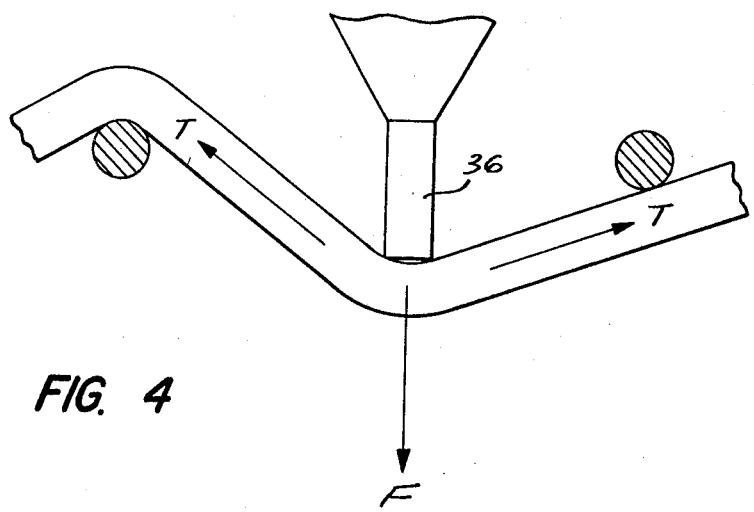
FIG. 4 is a diagrammatic view of the blade portion of the testing device shown in FIG. 1 imposed upon a yarn of the fabric of FIG. 3.

Hence, as seen in FIG. 4, the force is exerted by the blade in the direction of the arrow F which exerts a tensile force in the yarn in the direction of the arrows T. The force developed in the yarn in resisting the force exerted by the blade is thereby measured by measurement of the force exerted by the blade and, hence, the strength of the fabric yarns is determined. Therefore, it is possible either to apply a known force which may or may not be sufficient to puncture the fabric, or to measure the magnitude of the force required to puncture the fabric.

The instrument can be set to provide a given force and the fabric tested to that force in a poorly lighted place or a place in which it would be awkward to see the scale at the time of test. This is a distinct advantage since it does not require a reading of a dial or scale at the time of test.

Since the shape of the grip is designed to give an indication by feel of the direction of the blade, it is not necessary to see the blade in order to put it in the proper position to measure lengthwise or crosswise strength as desired.

I claim:

1. A fabric testing device including a handle, a plunger slidably supported in said handle for longitudinal movement, spring means yieldingly urging said plunger to a normal position longitudinal of said handle, a plunger portion of said plunger projecting from the handle in said normal position and a non-cutting rectangular faced blade supported by said plunger to be impressed upon a yarn or yarns of said fabric on one side thereof whereby upon pressing said blade against said yarn said plunger will be moved against the force of said spring when the strength of said yarn is sufficiently high to resist breaking.

2. A fabric testing device in accordance with claim 1 in which means are provided for altering the force of said spring means.

3. A fabric testing device in accordance with claim 1 in which means are provided for determining the orientation of said blade relative to said yarns.

4. A fabric testing device in accordance with claim 1 in which said handle is provided with a threaded inside bore and said plunger projects within said bore, said spring means consists of a helical coil surrounding said plunger, a flange is provided on said plunger, externally threaded cover means are provided with the threads thereof constructed and arranged to cooperate with the internal threads of said bore to allow positioning of said cover means with respect to said handle within said bore, and said spring is between said flange and said cover means.

5. A fabric testing device in accordance with claim 4 in which the force exerted by said spring is determined by the distance between said flange and said spring cover means.

References Cited

UNITED STATES PATENTS

| 1,328,349 | 1/1920 | Webb | 73—102 |
| 1,413,305 | 4/1922 | Webb | 73—102 |
| 1,903,524 | 4/1933 | Webster | 73—81 |
| 2,522,544 | 9/1950 | Seyboth | 73—102 |

JERRY W. MYRACLE, Primary Examiner

U.S. Cl. X.R.

73—81